United States Patent
Huang et al.

(10) Patent No.: US 9,111,339 B1
(45) Date of Patent: Aug. 18, 2015

(54) SYSTEM AND METHOD FOR REDUCING NOISE FROM AN IMAGE

(71) Applicant: Marvell International Ltd., Hamilton (BM)

(72) Inventors: Samson Huang, Saratoga, CA (US); Yuning Yang, East Lansing, MI (US); Ping-Sing Tsai, Cedar Park, TX (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/338,973

(22) Filed: Jul. 23, 2014

Related U.S. Application Data (60) Provisional application No. 61/860,849, filed on Jul. 31, 2013.

(51) Int. Cl.
 *G06K 9/40* (2006.01)
 *G06T 5/00* (2006.01)

(52) U.S. Cl.
 CPC ..................................... *G06T 5/002* (2013.01)

(58) Field of Classification Search
 USPC ......... 382/264, 260, 299, 162, 167, 265, 166, 382/240, 165, 274, 254, 168; 345/87, 102, 345/214, 690; 348/607, 700, 701, 384.1, 348/473, 613, 608, E5.077, E5.062; 375/240.29, E7.193
 See application file for complete search history.

(56) References Cited

U.S. PATENT DOCUMENTS

| 5,016,104 | A  | * | 5/1991 | Lim ................................ 348/613 |
| 5,285,470 | A  | * | 2/1994 | Schreiber ..................... 348/384.1 |
| 6,996,186 | B2 | * | 2/2006 | Ngai et al. ................... 375/240.29 |
| 7,181,086 | B2 | * | 2/2007 | Gindele et al. ................. 382/265 |
| 7,257,271 | B2 | * | 8/2007 | Adams et al. .................. 382/275 |
| 7,391,901 | B2 | * | 6/2008 | de Queiroz et al. ........... 382/166 |
| 8,824,833 | B2 | * | 9/2014 | Dagher et al. ................. 382/294 |

FOREIGN PATENT DOCUMENTS

JP                   05153608        *    6/1993     ............... H04N 9/64

\* cited by examiner

*Primary Examiner* — Anh Do (57) ABSTRACT

Systems and methods for reducing noise in an image are provided. Noise is reduced in a luminance channel of the image using a first filtering procedure. Noise is reduced in a chrominance channel of the image using a second filtering procedure. The chrominance channel is decomposed into a plurality of frequency sub-bands, where each frequency sub-band of the plurality of frequency sub-bands represents the chrominance channel at a first resolution. The noise is further reduced in the chrominance channel using a third filtering procedure. The third filtering procedure is applied to each frequency sub-band of the plurality of frequency sub-bands. A lowest frequency sub-band of the plurality of frequency sub-bands is decomposed into a second plurality of frequency sub-bands after the third filtering procedure. Each frequency sub-band of the second plurality of frequency sub-bands represents the chrominance channel at a second resolution that is lower than the first resolution.

20 Claims, 8 Drawing Sheets

SYSTEM AND METHOD FOR REDUCING NOISE FROM AN IMAGE

CROSS-REFERENCE TO RELATED APPLICATIONS

This disclosure claims priority to U.S. Provisional Patent Application No. 61/860,849, filed on Jul. 31, 2013, which is incorporated herein by reference in its entirety.

TECHNICAL FIELD

The technology described in this document relates generally to the field of image processing and more particularly to systems and methods for reducing noise from an image.

BACKGROUND

High resolution complementary metal-oxide-semiconductor (CMOS) and charge-coupled device (CCD) image sensors are highly demanded in today's market for their use in acquiring high quality images. For example, such image sensors may be used in digital cameras, smart phone cameras, and other digital devices including camera functionality. However, in order to keep die sizes small, pixel sizes used in these image sensors may be reduced. The smaller pixel size lowers the image sensor's ability to detect a number of impinging photons, thus causing images acquired by the image sensor to have a lower signal-to-noise ratio (SNR). The SNR decreases further when the image sensor is being used in a low light condition.

SUMMARY

The present disclosure is directed to systems and methods for reducing noise in an image. In an example method of reducing noise in an image, noise is reduced in a luminance channel of the image using a first filtering procedure. Noise is reduced in a chrominance channel of the image using a second filtering procedure. The chrominance channel is decomposed into a first plurality of frequency sub-bands after the second filtering procedure, where each frequency sub-band of the first plurality of frequency sub-bands represents the chrominance channel at a first resolution. The noise is further reduced in the chrominance channel using a third filtering procedure after the decomposing of the chrominance channel into the first plurality of frequency sub-bands. The third filtering procedure is applied to each frequency sub-band of the first plurality of frequency sub-bands. A lowest frequency sub-band of the first plurality of frequency sub-bands is decomposed into a second plurality of frequency sub-bands after the third filtering procedure. Each frequency sub-band of the second plurality of frequency sub-bands represents the chrominance channel at a second resolution that is lower than the first resolution.

In another example, an example system for reducing noise in an image includes a first filter configured to reduce noise in a luminance channel of the image using a first filtering procedure. A second filter is configured to reduce noise in a chrominance channel of the image using a second filtering procedure. The example system further includes a first transformation unit configured to decompose the chrominance channel into a first plurality of frequency sub-bands after the second filtering procedure. Each frequency sub-band of the first plurality of frequency sub-bands represents the chrominance channel at a first resolution. A third filter is configured to further reduce the noise in the chrominance channel using a third filtering procedure after the decomposing of the chrominance channel into the first plurality of frequency sub-bands. The third filtering procedure is applied to each frequency sub-band of the first plurality of frequency sub-bands. The example system also includes a second transformation unit configured to decompose a lowest frequency sub-band of the first plurality of frequency sub-bands into a second plurality of frequency sub-bands after the third filtering procedure. Each frequency sub-band of the second plurality of frequency sub-bands represents the chrominance channel at a second resolution that is lower than the first resolution.

DETAILED DESCRIPTION

Figure 1A:
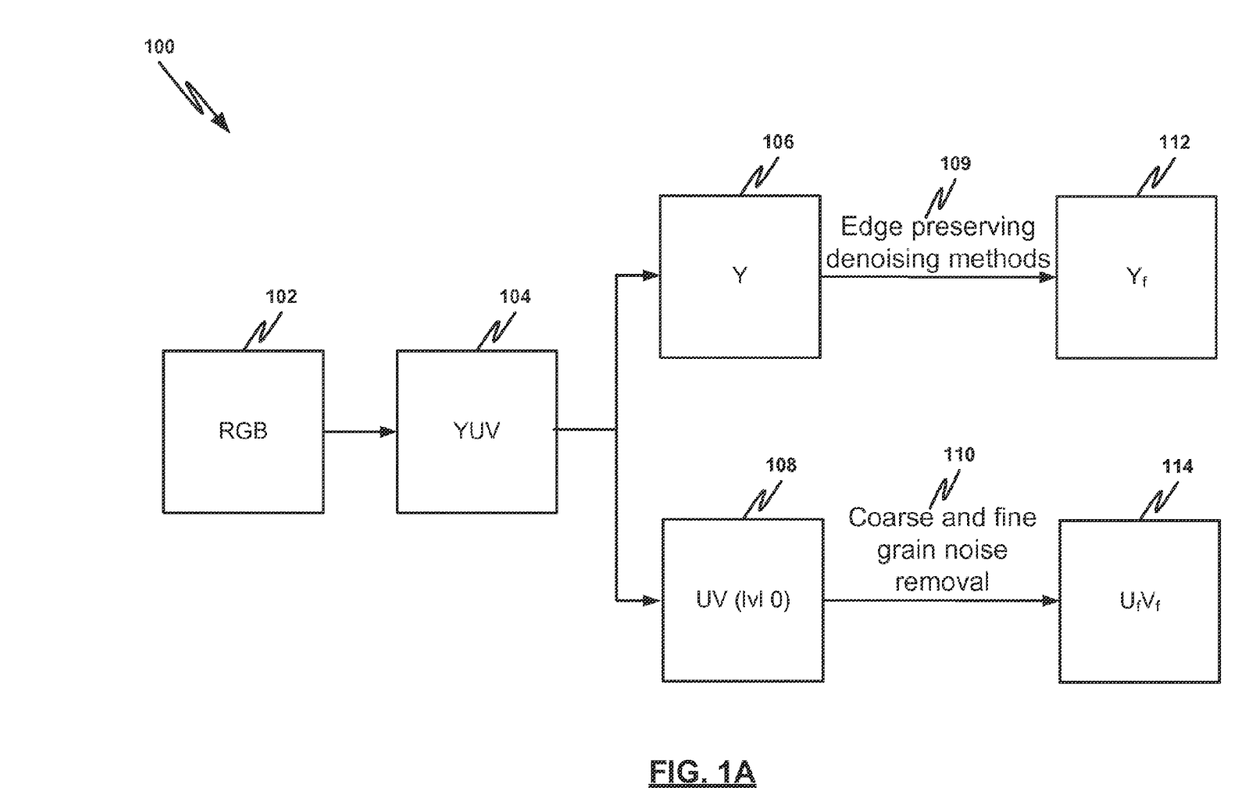
FIG. 1A is a block diagram depicting an example system for reducing noise in an image.

FIG. 1A is a block diagram 100 depicting an example system for reducing noise in an image. In the example of FIG. 1A, a color input image is received in a Red Green Blue (RGB) format 102 and thereafter converted to a second, different format. In the example of FIG. 1A, the second format is a YUV format 104, but in other examples, additional other second formats are used (e.g., a perceptually uniform CIE-L*A*B* color space format, etc.). In an example, the conversion from the RGB format 102 to the YUV format 104 is performed in order to allow constituent components of the color input image to be subject to different types of processing. For example, when image data processing is performed in the RGB format 102, the three components (i.e., red, green, and blue components) are necessarily subject to the same processing. By contrast, in the case of the YUV format 104, a luminance Y channel can be processed separately from a color-difference U channel and a color-difference V channel. The luminance Y channel of the YUV format 104 (also known as the "luma" component of the YUV image) indicates a brightness of the image. The color-difference U and color-difference V channels of the YUV format 104 (also known as "chroma" components of the YUV image) indicate a color of the image.

In the example system of FIG. 1A and in additional examples described below, a noise reduction framework utilizes separate, different processing methods for filtering the luminance and chrominance channels 106, 108 of the input image. Specifically, in processing the luminance channel 106, a first method is used that places an emphasis on preserving edges and textures in the luminance channel 106. In processing the chrominance channel 108, a second, different method is used that places an emphasis on removal of both coarse grain noise and fine grain noise from the chrominance channel 108. In an example, the processing of the luminance and chrominance channels 106, 108 occurs via two separate filters, where the two separate filters process the luminance and chrominance channels 106, 108 independently of each other using different filter parameters. The use of the separate, different processing methods for reducing noise in the luminance and chrominance channels 106, 108 is in contrast to alternative noise reduction methods that use same or similar procedures in reducing noise from both of the channels 106, 108.

An example of the independent processing of the luminance and chrominance channels 106, 108 is illustrated in FIG. 1A. In FIG. 1A, the luminance channel (Y) 106 of the image is processed via edge preserving denoising methods 109 to generate a filtered luminance channel ($Y_f$) 112. The processing of the luminance channel 106 via the edge preserving denoising methods 109 reflects the fact that the Y channel of an image generally includes more edge information and texture information as compared to the U and V channels of the image. In an example, in order to preserve the edge information and texture information in the luminance channel 106, the edge preserving denoising methods 109 include a block-matching three-dimensional (BM3D) filtering procedure. The BM3D filtering procedure removes noise from the luminance channel 106 without requiring a decomposition of the luminance channel 106 into frequency sub-bands. In another example, the edge preserving denoising methods 109 include a multi-resolution filtering (MRF) procedure that utilizes such a decomposition of the luminance channel 106 into frequency sub-bands. When the MRF procedure is used to filter the luminance channel 106, parameter settings that place an emphasis on maintaining edges and textures in the luminance channel 106 are used. The BM3D and MRF filtering procedures are described in further detail below.

In FIG. 1A, the chrominance channel (UV) 108 of the image is processed using denoising methods 110 to generate a filtered chrominance channel ($U_fV_f$) 114. As illustrated in FIG. 1A, the denoising methods 110 specifically include coarse grain noise removal and fine grain noise removal procedures. The processing of the chrominance channel 108 using such coarse and fine grain noise removal procedures reflects the fact that the U and V channels of the input image generally include significant chrominance noise (i.e., color noise) including both coarse and fine grain noise. In an example, the chrominance noise includes low frequency noise having a relatively large noise size (e.g., a noise size including 10-20 pixel patches of the image or larger). Such low frequency noise differs from high frequency noise (also known as "salt and pepper" noise) that includes a relatively small noise size that is on the order of a single pixel or several pixels. High frequency noise can be removed via conventional methods that involve defining a window (e.g., a kernel) of pixels that is larger than the size of the noise and then performing noise removal techniques (e.g., smoothing techniques) within the window to remove the noise within the window.

Such conventional methods are generally unable to remove low frequency noise, however. For example, in attempting to remove the low frequency noise via the conventional methods, a required window size may be unreasonably large to accommodate the relatively large size of the low frequency noise, and it may be difficult to distinguish the low frequency noise from actual features of the image, etc. As described in further detail below, the coarse and fine grain noise removal methods 110 present alternative techniques for the removal of the relatively large noise included in the chrominance channel 108.

Specifically, the coarse and fine grain removal methods 110 utilize image decomposition procedures (e.g., discrete wavelet transformations) to decrease the size of the chrominance noise features, thus enabling the chrominance noise features to be removed via conventional techniques, such as the window-based smoothing techniques described above. In an example, an image decomposition procedure is used to downsample and reduce the size of the chrominance channel 108 of the image. In the example, the chrominance channel 108 is downsampled by a factor of two and reduced in size by a factor of four, such that the chrominance channel 108, following such procedures, has a resolution of one-half the original resolution and a size of one-fourth of the original size. After the first decomposition, the downsampled and size-reduced features of the chrominance channel 108 are subject to noise filtering. After the noise filtering, a second decomposition procedure including additional downsampling and size reduction is performed on the chrominance channel 108. With each subsequent decomposition, a size of the chrominance noise decreases, thus enabling the filtering of the chrominance noise using the conventional techniques described above.

As an example of the use of the decomposition procedures, chrominance noise with dimensions on the order of 32 pixels is reduced in size to be on the order of 8 pixels using a first decomposition, and a second decomposition reduces the chrominance noise size to be on the order of 2 pixels. After performing this size reduction, the chrominance noise with the size on the order of 2 pixels can be filtered via a window-based smoothing technique with a window size of 7 pixels×7 pixels, for example.

In addition to the decomposition procedures described above, the coarse and fine grain noise removal methods 110 also utilize filtering procedures prior to each decomposition. In this manner, chrominance noise is removed at each step of the decomposition and not only after the chrominance channel 108 has been decomposed to a lowest size and resolution. In an example, in order to remove such coarse and fine grain noise in the chrominance channel 108, the coarse and fine grain noise removal methods 110 include an MRF filtering procedure that involves one or more decompositions of the chrominance channel 108. The MRF filtering procedure utilizes second parameter settings focusing on noise removal, and such second parameter settings differ from the first parameter settings discussed above for the use of the MRF filter in the edge preserving denoising methods 109.

Figure 1B:
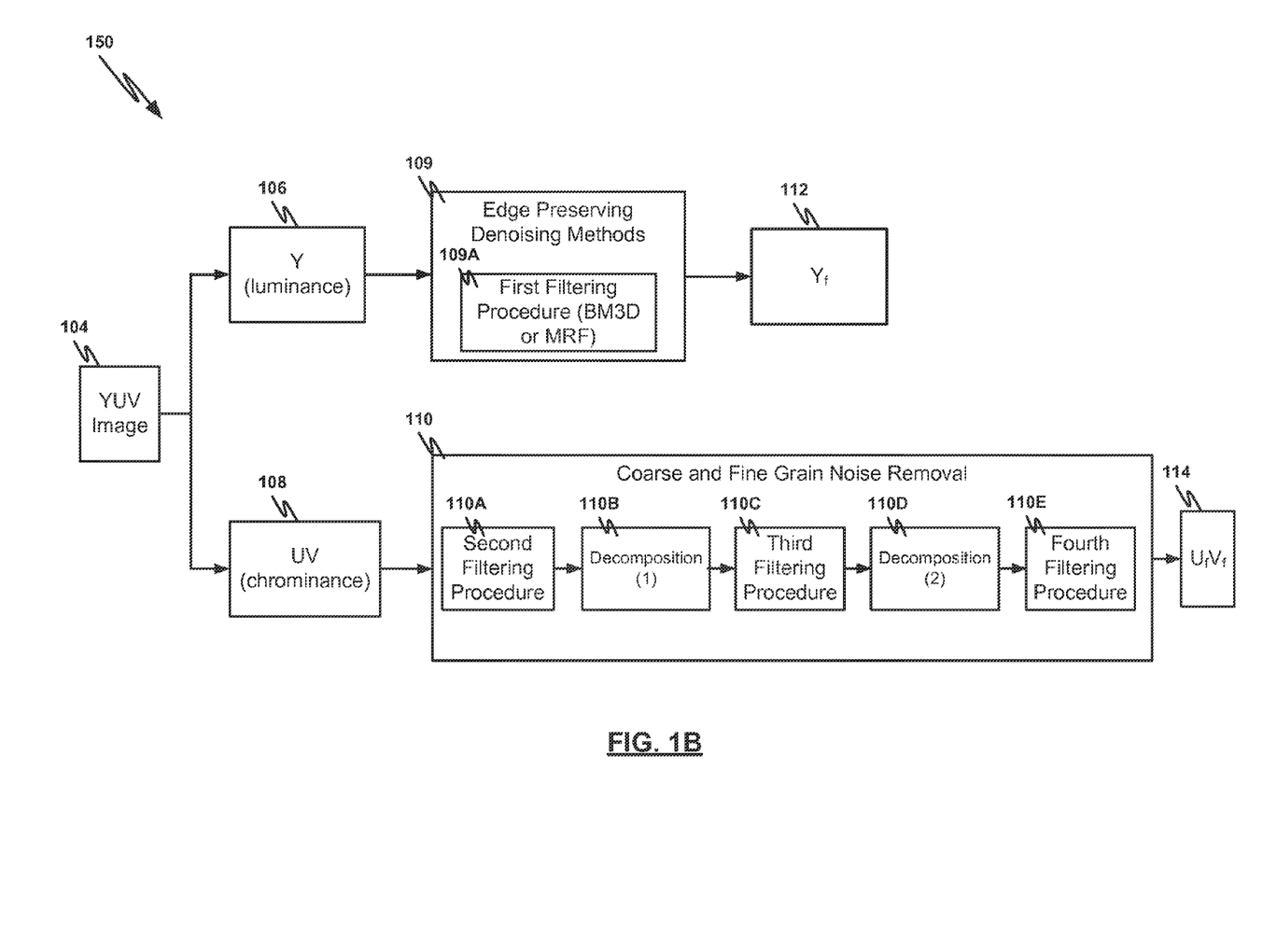
FIG. 1B is a block diagram depicting an example of an independent processing of luminance and chrominance channels using two different noise reduction methods.

FIG. 1B is a block diagram 150 depicting an example of the different, independent processing that is used in reducing noise from the luminance and chrominance channels 106, 108. As depicted in FIG. 1B, noise is reduced in the luminance channel 106 via a first filtering procedure 109A. In an example, the first filtering procedure 109A utilizes a BM3D filter that does not decompose the luminance channel 106. In another example, the first filtering procedure 109A utilizes an MRF filtering procedure that decomposes the luminance channel 106 in a manner similar to the decomposition procedures discussed above.

In processing the chrominance channel 108 using the coarse and fine grain noise removal methods 110 to generate the filtered chrominance channel 114, multiple filtering procedures are used, where the multiple filtering procedures are used during a decomposition of the chrominance channel 108. Thus, as illustrated in FIG. 1B, noise is reduced in the chrominance channel 108 using a second filtering procedure 110A. In an example, the second filtering procedure 110A uses a bilateral filtering technique that is described in further detail below. At 110B, the chrominance channel 108 is subject to a decomposition procedure (e.g., a decomposition procedure similar to those described above) after the second filtering procedure 110A.

Noise is further reduced in the chrominance channel 108 using a third filtering procedure 110C after the decomposing of the chrominance channel 108 at 110B. In an example, the decomposing of the chrominance channel 108 at 110B causes a plurality of frequency sub-bands (e.g., LL, LH, HL, and HH frequency sub-bands) to be generated. The third filtering procedure 110C is applied to each frequency sub-band of the plurality of frequency sub-bands. In an example, the third filtering procedure 110C uses i) a bilateral filtering procedure on one or more of the frequency sub-bands of the plurality of frequency sub-bands, and ii) a wavelet thresholding filtering procedure on other frequency sub-bands of the plurality of frequency sub-bands. Specifically, in the example, the bilateral filtering procedure is used on an LL frequency sub-band of the plurality of frequency sub-bands, and the wavelet thresholding filtering procedure is used on LH, HL, and HH frequency sub-bands of the plurality of frequency sub-bands. It should be understood that the noise removal via the second filtering procedure 110A and the third filtering procedure 110C is cumulative. Thus, at the start of the third filtering procedure 110C, a noise level of the chrominance channel 108 has already been reduced via the second filtering procedure 110A, and the third filtering procedure 110C is then used to remove additional noise from the chrominance channel 108.

At 110D, a lowest frequency sub-band of the plurality of frequency sub-bands is decomposed into a second plurality of frequency sub-bands after the third filtering procedure 110C. In examples where a discrete wavelet transformation is used to decompose the chrominance channel 108, the lowest frequency sub-band that is decomposed via the second decomposition 110D is an LL frequency sub-band. In an example, additional filtering procedures are performed on the second plurality of frequency sub-bands as part of the coarse and fine grain noise removal methods 110. For example, as illustrated in FIG. 1B, a fourth filtering procedure 110E may be used after the decomposing at 110D. The fourth filtering procedure 110E is applied to each frequency sub-band of the second plurality of frequency sub-bands. In an example, the fourth filtering procedure 110E uses i) a bilateral filtering procedure on one or more of the frequency sub-bands of the second plurality of frequency sub-bands, and ii) a wavelet thresholding filtering procedure on other frequency sub-bands of the second plurality of frequency sub-bands. Specifically, in the example, the bilateral filtering procedure is used on an LL frequency sub-band of the second plurality of frequency sub-bands, and the wavelet thresholding filtering procedure is used on LH, HL, and HH frequency sub-bands of the second plurality of frequency sub-bands.

As illustrated in the example of FIG. 1B, the example noise reduction system described herein utilizes filtering operations (e.g., second, third, and fourth filtering procedures 110A, 110C, and 110E) within a decomposition path. Utilizing the filtering operations in the decomposition path thus causes there to be a filtering operation prior to each decomposition and not only after the chrominance channel 108 has been decomposed to a lowest resolution.

Figure 2:
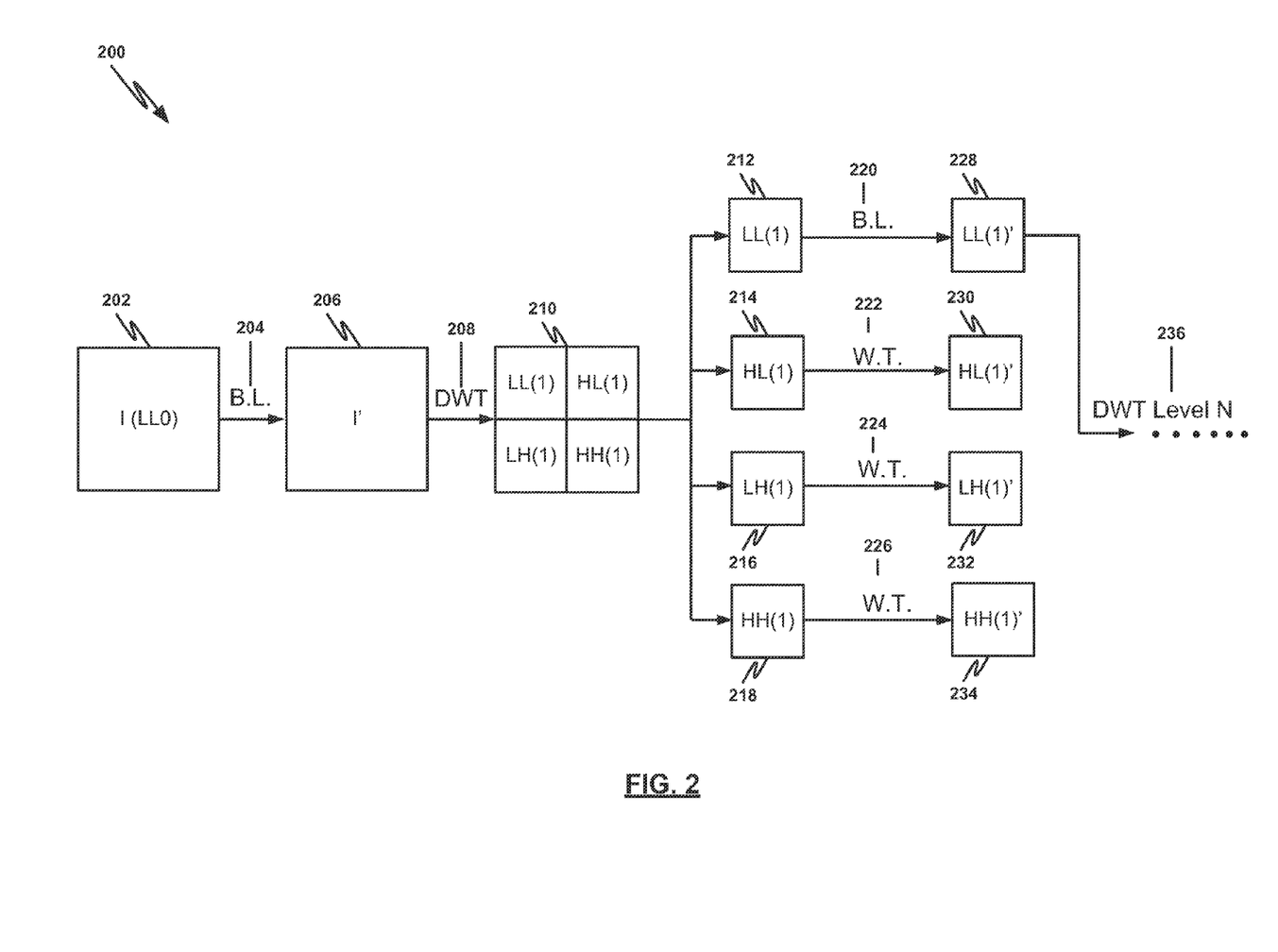
FIG. 2 is a block diagram depicting an example multi-resolution filter including bilateral filtering procedures and wavelet threshold filtering procedures.

FIG. 2 is a block diagram 200 depicting an example multi-resolution filter (MRF) including bilateral filtering procedures 204, 220 and wavelet threshold filtering procedures 222, 224, 226. As described below, the MRF filter i) performs decomposition of an input image 202, and ii) reduces the noise in the image 202 at each stage of the decomposition via the aforementioned bilateral filtering and wavelet thresholding procedures. In the filtering performed by the example MRF filter of FIG. 2, the input image 202 is in a YUV format including a luminance (Y) channel and a chrominance (UV) channel. Although the color-difference U channel and the color-difference V channel are processed together in the example of FIG. 2 and referred to collectively as the "chrominance channel," it should be understood that the color-difference U and color-difference V channels are separated and processed independently in other examples.

The input image 202 is subject to a bilateral filtering procedure 204 to generate a filtered image 206. The bilateral filtering procedure 204 is configured to perform spatial averaging over a window of pixels of the input image 202 to reduce noise in the input image 202. Specifically, the bilateral filtering procedure operation 204 takes a weighted sum of pixels in a local neighborhood of a particular pixel of the input image 202 to generate a new value for the particular pixel. These aspects of the bilateral filtering procedure 204 are known to those of ordinary skill in the art. In an example, the weights of the bilateral filtering procedure 204 depend on both a spatial distance and an intensity distance within the input image 202. At a particular pixel x, an output of the bilateral filter is calculated according to a first equation:

$$\tilde{I}(x) = \frac{1}{C} \sum_{y \in N(x)} e^{\frac{-\|y-x\|^2}{2\sigma_d^2}} e^{\frac{-|I(y)-I(x)|^2}{2\sigma_r^2}} I(y), \quad \text{(Eqn. 1)}$$

where $\sigma_d$ (i.e., "distance sigma") and $\sigma_r$ (i.e., "range sigma") are parameters controlling a distribution of the weights in the spatial and intensity domains, respectively, N(x) is a spatial neighborhood of pixel x, I(x) is an intensity of the pixel x, I(y) is an intensity of a pixel y that is in the spatial neighborhood, and C is a normalization constant defined by a second equation:

$$c = \sum_{y \in N(x)} e^{\frac{-\|y-x\|^2}{2\sigma_d^2}} e^{\frac{-|I(y)-I(x)|^2}{2\sigma_r^2}}. \quad \text{(Eqn. 2)}$$

The distance sigma and range sigma values correspond, generally, to a strength of the bilateral filter. Thus, if large distance sigma and range sigma values are used, a high filter strength is applied to the input image 202, which may result in significant noise reduction (e.g., smoothing) while causing loss of edge and texture information in the input image 202. By contrast, if small distance sigma and range sigma values are used, a low filter strength is applied, which may preserve edges in the input image 202 but not adequately filter noise included in the input image 202.

The filtered image 206 is subject to a discrete wavelet transformation ("DWT") procedure 208 to decompose the filtered image 206. In decomposing the filtered image 206, a plurality of frequency sub-bands 210 are generated. As illustrated in FIG. 2, the plurality of frequency sub-bands 210 include the sub-bands LL(1), HL(1), LH(1), and HH(1). The decomposing of the filtered image 206 is accomplished, in an example, using at least two filters. In the example, the two filters comprise a horizontal filter and a vertical filter. For example, for a two-dimensional wavelet transformation, the decomposition operation is performed on the filtered image 206 in a horizontal direction and a vertical direction. The horizontal and vertical filters are high pass filters, low pass filters, or other filters.

Figure 3:
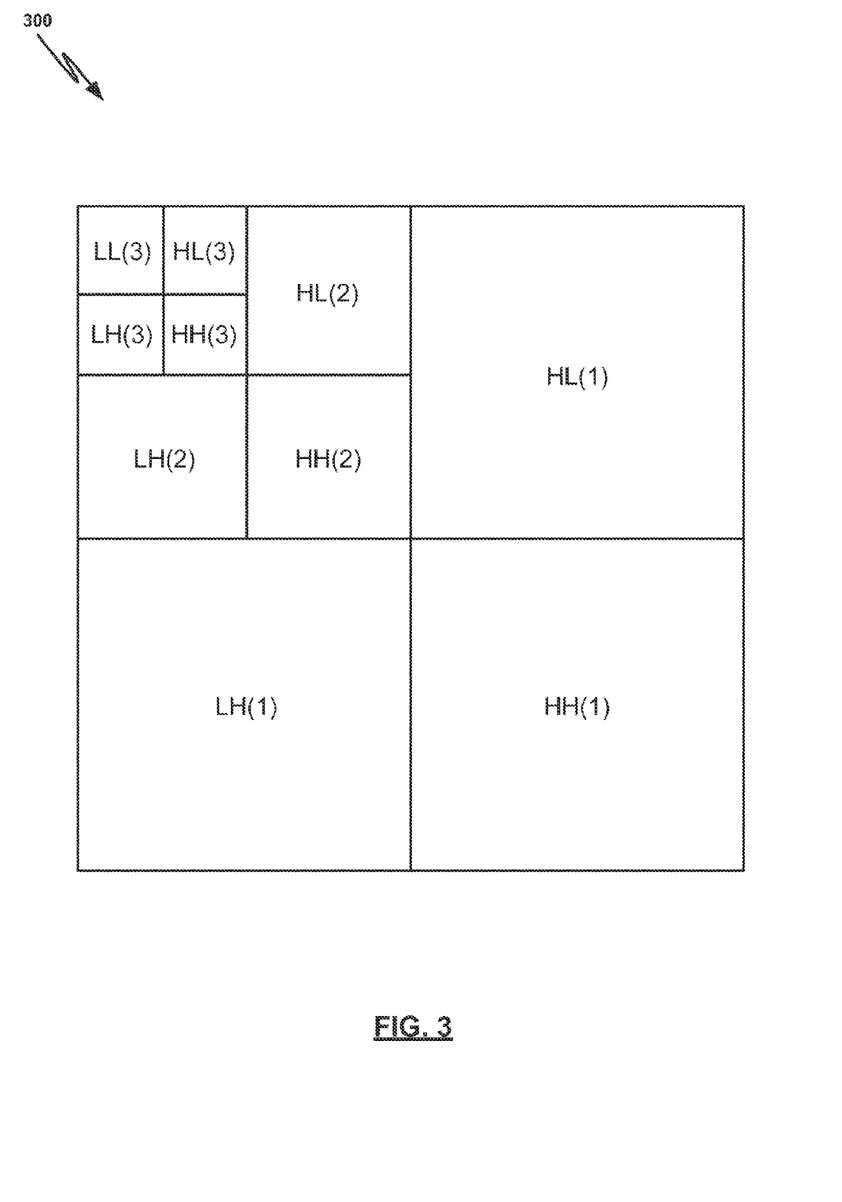
FIG. 3 is a diagram illustrating an example wavelet transformation image.

FIG. 3 depicts aspects of the discrete wavelet transformation procedure 208 and illustrates an example wavelet transformation image 300. In the example shown in FIG. 3, an input image, which is the filtered input image 206 in the example of FIG. 2, is divided into HH(1), HL(1), LH(1), and LL(1) frequency sub-bands via the wavelet transformation procedure. "H" represents a high frequency component, and "L" represents a low frequency component. The HH sub-band is obtained by passing a horizontal component and a vertical component of the image through a high frequency filter. The HL sub-band and the LH sub-band are obtained by passing either the horizontal or the vertical component through a high frequency filter and passing the other component through a low frequency filter. The LL sub-band is obtained by passing the horizontal component and the vertical component through a low frequency filter. The HH sub-band is a highest frequency sub-band of the four sub-bands, and the LL sub-band is a lowest frequency sub-band of the four sub-bands. In an example, the LL sub-band includes more chrominance noise (i.e., color noise) than the LH, HL, and HH sub-bands.

Wavelet transformation is used to decompose the input image multiple times in the example of FIG. 3. The number shown in brackets refers to a decomposition level or a resolution level, such that in the example of FIG. 3, the image has been decomposed three times, thus yielding three resolution levels. Level 1 is a highest resolution level in FIG. 3, and Level 3 is a lowest resolution level. It should be understood that the decomposition procedure of FIG. 3 includes aspects of the decomposition procedure described above with reference to FIG. 1A. For example, in generating the LL(1), HL(1), LH(1), and HH(1) frequency sub-bands, the input image is downsampled to reduce the resolution of the input image, thus yielding the frequency sub-bands at the Level 1 resolution that is lower than that of the original image. Further, a size of the input image is reduced by a factor of four in the LL(1), HL(1), LH(1), and HH(1) frequency sub-bands, as illustrated in FIG. 3.

With reference again to FIG. 2, following the decomposition performed via the discrete wavelet transformation procedure 208 to generate the plurality of frequency sub-bands 210, each frequency sub-band of the plurality of frequency sub-bands 210 is subject to further filtering. Thus, as illustrated in FIG. 2, an LL(1) sub-band 212 is subject to a second bilateral filtering procedure 220 to generate a filtered LL(1) sub-band 228. The second bilateral filtering procedure 220 is the same or similar to the first bilateral filtering procedure 204 described above.

In FIG. 2, HL(1) 214, LH(1) 216, and HH(1) 218 frequency sub-bands are subject to wavelet threshold filtering procedures 222, 224, 226, respectively. The wavelet threshold filtering procedures 222, 224, 226 are used to separate noise signals from image signals in the HL(1) 214, LH(1) 216, and HH(1) 218 sub-bands. The discrete wavelet transformation 208 transforms the input image 202 into the wavelet domain, such that each of the frequency sub-bands 210 includes wavelet coefficients that correspond to pixels. In the wavelet domain, image features are represented by large coefficients while noise features are represented by small coefficients. Thus, the wavelet threshold filtering procedures 222, 224, 226 remove noise from the sub-bands 214, 216, 218 by eliminating coefficients that are less than a threshold value. Following the removal of the coefficients that are less than the threshold value, the remaining coefficients are used to reconstruct the image signals of the sub-bands 214, 216, 218. The filtering of the HL(1) 214, LH(1) 216, and HH(1) 218 sub-bands using the wavelet threshold filtering procedures 222, 224, 226 results in the filtered sub-bands HL(1)' 230, LH(1)' 232, and HH(1)' 234, respectively. In an example, the wavelet threshold filtering procedures 222, 224, 226 utilize a Bayes Shrink wavelet thresholding algorithm that is known to those of ordinary skill in the art.

Additional discrete wavelet transformation procedures similar to the wavelet transformation procedure 208 are performed to decompose the LL(1) sub-band 212, where the LL(1) sub-band 212 is a lowest frequency sub-band of the plurality of frequency sub-bands 210. For example, FIG. 2 illustrates a second discrete wavelet transformation 236 that is performed on the filtered LL(1)' 228 sub-band to generate additional sub-bands LL(2), HL(2), LH(2), and HH(2). The LL(2), HL(2), LH(2), and HH(2) sub-bands are depicted in FIG. 3. At each level of decomposition, the LL sub-band is processed by a bilateral filter, and the HL, LH, and HH sub-bands are processed by wavelet thresholding filters. Additional discrete wavelet transformation procedures may be performed to further decompose the input image 202. For example, FIG. 3 depicts LL(3), HL(3), LH(3), and HH(3) sub-bands, and these sub-bands are generated by performing a decomposition procedure on the LL(2) sub-band. In accordance with the example system described herein, the LL(2) sub-band is subject to a filtering procedure utilizing a bilateral filter prior to the decomposition procedure.

The example MRF filter of FIG. 2 illustrates the use of the MRF filter to decompose the input image 202 and filter noise from the input image 202 at each level of the decomposition process. For example, as described above, the MRF filter decomposes the input image 202 into various resolution levels, and at each resolution level, the LL sub-band is processed by a bilateral filter. Following the processing of the LL sub-band by the bilateral filter, the filtered LL sub-band is further decomposed to generate frequency sub-bands of a lower resolution level. In this manner, the MRF filter of FIG. 2 uses the bilateral filter in the decomposition (forward) path of the MRF filter rather than the reconstruction (reverse) path of the MRF filter. The use of the bilateral filter in the decomposition path is in contrast to alternative methods that use the bilateral filter in the reconstruction of the image from the frequency sub-bands.

Figure 4:
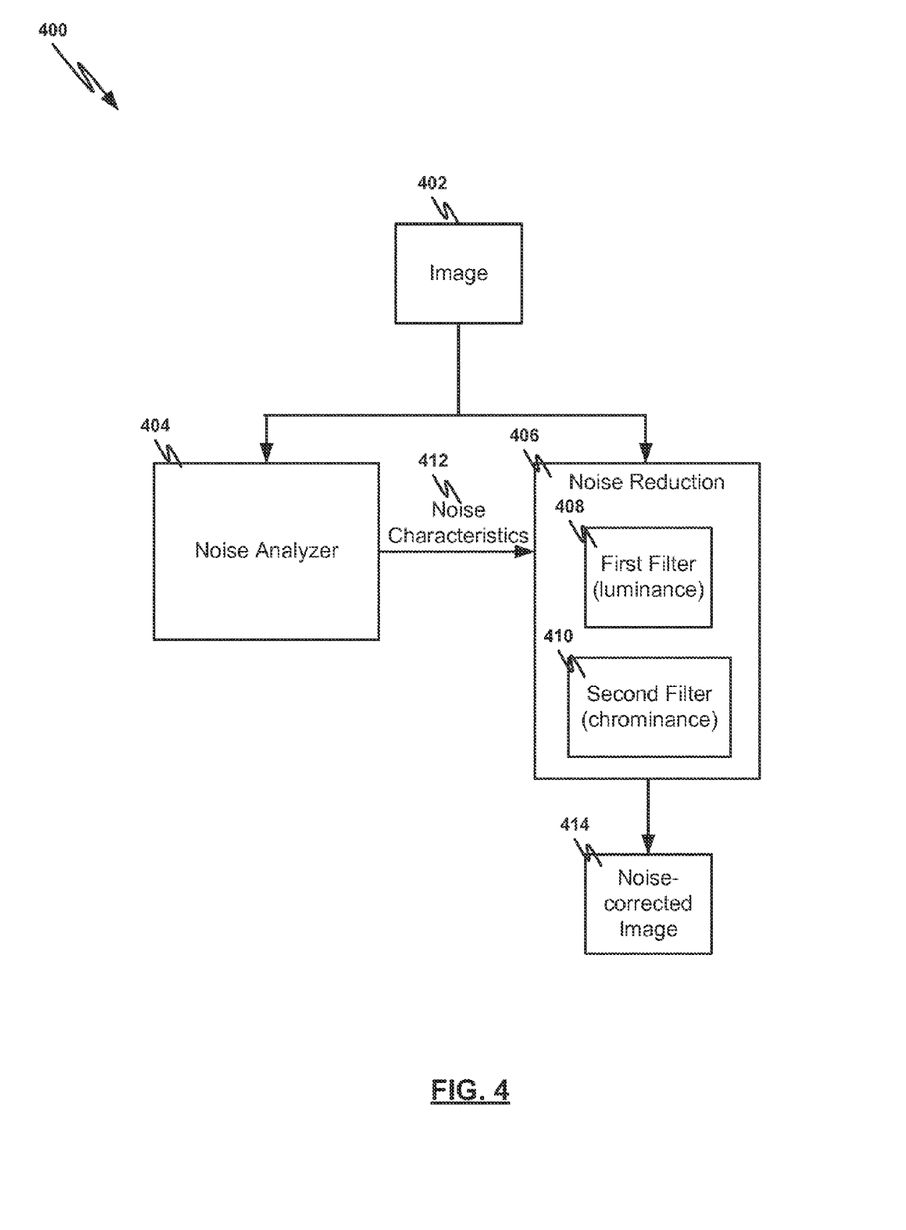
FIG. 4 is a block diagram illustrating an example system for reducing noise in an image that includes a noise analyzer and a noise reduction module.

FIG. 4 is a block diagram 400 illustrating an example system for reducing noise in an image 402 that includes a noise analyzer 404 and a noise reduction module 406. In FIG. 4, the noise reduction module 406 includes a first filter 408 for reducing noise from a luminance channel of the image 402 and a second filter 410 for reducing noise from a chrominance channel of the image 402. Thus, the noise reduction module 406 receives the image 402, reduces the noise in the image 402 using the first and second filters 408, 410, and outputs a noise-corrected image 414. In accordance with the examples described herein, the first and second filters 408, 410 of the noise reduction module 406 utilize independent, different processing methods in filtering noise from the luminance and chrominance channels. In an example, the first filter 408 is a BM3D filter that does not require a decomposition of the image 402, and the second filter 410 is an MRF filter (e.g., an MRF filter similar to that described above in FIG. 2) that decomposes the image one or more times, as described above. In another example, the first filter 408 utilizes a first MRF filtering procedure with first parameter settings that focus on preserving edges and textures in the luminance channel, and the second filter 410 utilizes a second MRF filtering procedure with second parameter settings that focus on removing noise from the image 402.

In the example utilizing the first and second MRF filtering procedures in the first and second filters 408, 410, respectively, both the luminance channel and the chrominance channel of the input image 402 are subject to decomposition procedures. However, parameters of the decomposition procedures vary based on the different characteristics of the luminance and chrominance channels. As described above, the chrominance channel generally includes more chrominance noise as compared to the luminance channel. Due to the challenges posed by the removal of the chrominance noise (e.g., challenges caused by the relatively large sizes of the chrominance noise features and other challenges described above with reference to FIG. 1A), the noise filtering for the chrominance channel may require more levels of decomposition and filtering than the noise filtering for the luminance channel.

In an example, the first MRF filtering procedure utilized in filtering the luminance channel uses a single decomposition procedure. Thus, the luminance channel of the image 402 is decomposed into LL(1), HL(1), LH(1), and HH(1) sub-bands, and these sub-bands are filtered, but no further decomposition is performed on the luminance channel. By contrast, in the example, the second MRF filtering procedure utilized in filtering the chrominance channel uses two or three decomposition levels. Thus, the chrominance channel of the image 402 is decomposed into LL(1), HL(1), LH(1), and HH(1) sub-bands, and the LL(11) sub-band is then further decomposed into LL(2), HL(2), LH(2), and HH(2) sub-bands. Additional decompositions may be utilized in processing the chrominance channel.

In an example, the BM3D or MRF filters employed in the first and second filters 408, 410 utilize filter parameters that are based on noise characteristics 412 of the image 402. In FIG. 4, a noise analyzer 404 receives the image 402 and analyzes the image 402 to determine the noise characteristics 412. The noise analyzer 404 provides the noise characteristics 412 to the noise reduction module 406, and parameter settings of the first and second filters 408, 410 are determined based on the noise characteristics 412.

In an example, the noise analyzer 404 determines standard deviation of noise values for the image 402. Because the image 402 is subject to decomposition at least in the second filter 410, the noise analyzer 404 is configured to determine the standard deviation of noise values at each decomposition level. Thus for each resolution level into which the image 402 is decomposed, the noise analyzer 404 determines the standard deviation of noise values. The standard deviation of noise values comprise at least a portion of the noise characteristics 412 that are provided to the noise reduction module 406. Specifically, in an example, the noise analyzer 404 determines the standard deviation of noise values for each unit of the image 402, where a unit of the image 402 comprises a single pixel of the image 402 or a group (e.g., a block) of pixels of the image 402. Parameter settings of the first and second filters 408, 410 are determined based on the standard deviation of noise values, as described in further detail below with reference to FIGS. 5 and 6.

Figure 5:
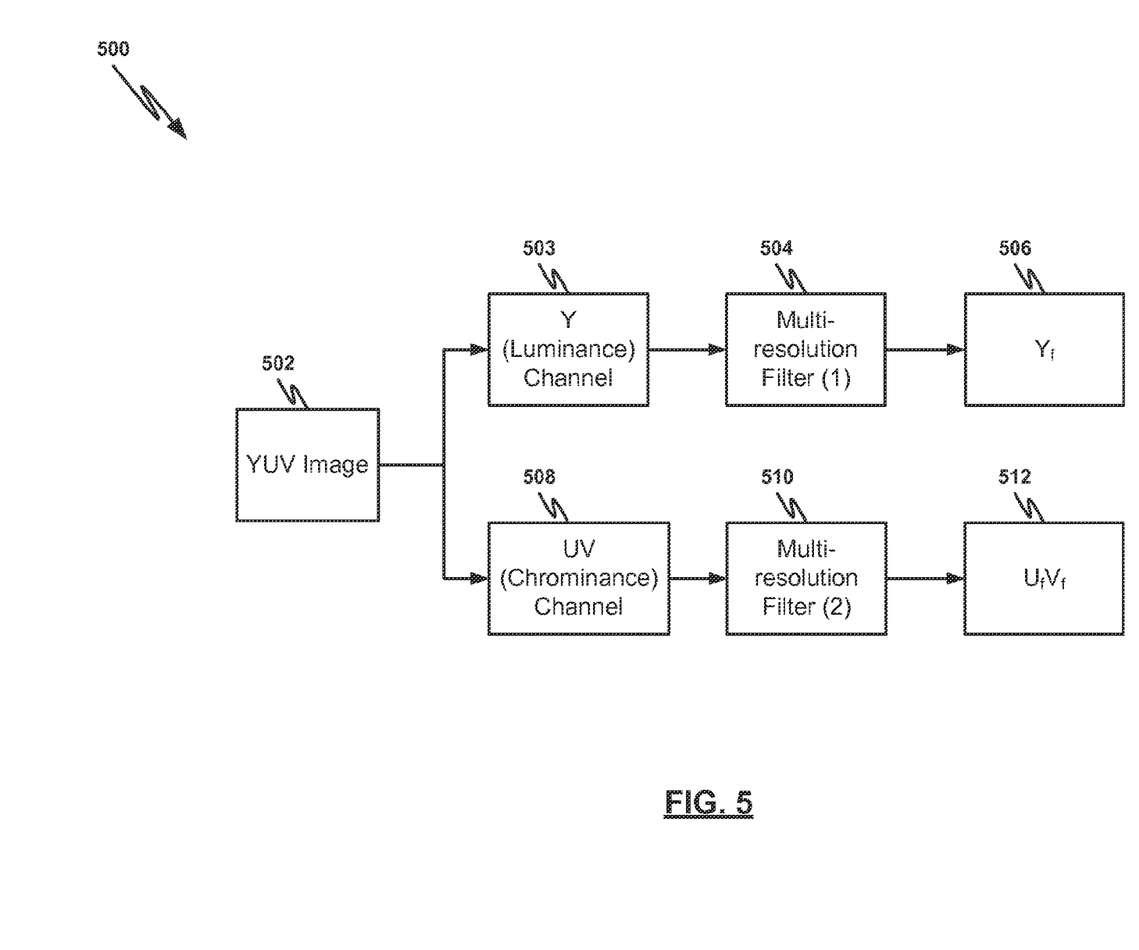
FIG. 5 is a block diagram for processing a YUV image using first and second multi-resolution filters.

FIG. 5 is a block diagram 500 for processing a YUV image 502 using first and second multi-resolution (MRF) filters 504, 510. The MRF filters 504, 510 perform decomposition and noise-filtering on luminance (Y) and chrominance (UV) channels 503, 508, respectively, of the YUV image 502. The MRF filters 504, 510 are the same or similar to the example multi-resolution filter of FIG. 2 but may utilize more levels of decomposition or fewer levels of decomposition than are used in the example of FIG. 2. The MRF filters 504, 510 are configured to perform the decomposition and noise-filtering on the luminance channel 503 and the chrominance channel 508 independently and using different filter parameters. Based on the independent processing of the luminance channel 503 and the chrominance channel 508, the MRF filters 504, 510 output a filtered $Y_f$ component 506 and filtered $UV_f$ component 512, respectively.

In accordance with the example described above with reference to FIG. 4, the MRF filters 504, 510 utilize filter parameters that are based on noise characteristics of the YUV image 502. In an example, the noise characteristics of the YUV image 502 include standard deviation of noise values for the YUV image 502. The MRF filters 504, 510 utilize bilateral filters and wavelet thresholding filters. As illustrated in Equation 1 above, a bilateral filter includes three basic parameter settings: $\sigma_d$ (i.e., "distance sigma"), $\sigma_r$ (i.e., "range sigma"), and N(x) (i.e., "window size"). A wavelet thresholding filter includes parameter settings that include a wavelet threshold value for wavelet coefficients. In an example, the window size and distance sigma are set to values of 11 pixels×11 pixels and 1.8, respectively, in the bilateral filters utilized by the MRF filters 504, 510. The remaining variables include the range sigma variable and the wavelet threshold value, which are both dependent on the noise standard deviation $\sigma_n$ for the YUV image 502. Thus, in order to determine values for the range sigma variables and wavelet threshold values, the noise standard deviation $\sigma_n$ for the YUV image 502 is determined.

The noise standard deviation $\sigma_n$ is determined via a noise analyzer component (e.g., the noise analyzer 404 of FIG. 4) or via another means. In an example, the determination of the noise standard deviation an is performed on a pixel-by-pixel basis, such that a noise standard deviation value is determined for each pixel of the YUV image 502. The pixel-by-pixel determination of $\sigma_n$ reflects the fact that noise is location dependent and thus varies across the different pixels of the YUV image 502. In the pixel-by-pixel determination, $\sigma_n$ is computed for each pixel of the YUV image 502 based on the assumption that a small window size at the center of the pixel follows a generalized Gaussian distribution ("GGD"). Because the YUV image 502 is decomposed into multiple different resolution levels by the MRF filters 504, 510, $\sigma_n$ is determined at each resolution level of the multiple different resolution levels. Specifically, the noise standard deviation $\sigma_n$ at each of the multiple different resolution levels is calculated from the $HH_t$ frequency sub-band, where t indicates the resolution level or decomposition level. The calculation of the noise standard deviation $\sigma_n$ at each of the multiple different resolution levels is in contrast to alternative noise reduction methods that utilize only the $HH_1$ frequency sub-band in estimating the noise standard deviation $\sigma_n$. In such alternative noise reduction methods, the utilization of only the $HH_1$ frequency sub-band causes the noise standard deviation $\sigma_n$ to be determined at a single resolution level with t=1.

In determining the noise standard deviation $\sigma_n$ at each resolution level, a modified robust median estimation method is used in an example. The modified robust median estimation method is defined based on an equation $$(\sigma_n)_{t,ij} = \frac{\text{Median}(|Y_{t,ij}|)}{0.6745}, \quad \text{(Eqn. 3)}$$

where $(\sigma_n)_{t,ij}$ is a standard deviation of noise for the YUV image 502 at a resolution level of t for a pixel of the YUV image 502 having coordinates of (i, j), and $Y_{t,ij} \in$ a window size of 11×11 at the center of (i,j) at level t.

In determining the range sigma $\sigma_r$ parameter values for the MRF filters 504, 510, a scaled version of the standard deviation of noise $\sigma_n$ is used in an example. Specifically, in determining the range sigma value at each of the resolution levels $(\sigma_r)_t$, a scaled version of the standard deviation of noise $(\sigma_n)_t$ is used. Because the noise filtering framework of FIG. 5 utilizes separate, different processing methods for filtering the luminance and chrominance channels 503, 508 of the YUV image 502, the parameter settings for the first MRF filter 504 differ from those of the second MRF filter 510. For example, the luminance channel 503 generally includes significant texture and edge information. Thus, in order to preserve as much texture and edge information as possible in the luminance channel 503, each pixel from the $LL_t$ frequency sub-band has its own range sigma $\sigma_r$ based on $(\sigma_n)_t$ in the first MRF filter 504. In an example, the range sigma $\sigma_r$ for filtering the luminance channel 503 in the first MRF filter 504 is determined according to:

$$(\sigma_r)^Y_{t,ij} = m_2 \times (\sigma_n)_{t,ij}, \quad \text{(Eqn. 4)}$$

where $(\sigma_n)_{t,ij}$ is a standard deviation of noise value for the YUV image 502 at a resolution level of t for a pixel of the YUV image 502 having coordinates of (i, j) as determined above using Equation 3, $(\sigma_r)_{t,ij}^Y$ is the range sigma $\sigma_r$ for the MRF filter 504 at the resolution level of t for the pixel of the YUV image 502 having the coordinates of (i, j), and $m_2$ is a second scaling factor that is an integer number.

As noted above, the luminance channel 503 generally includes more texture detail as compared to the chrominance channel 508. In attempting to remove the noise from the luminance channel 503, the removal of the noise may have an effect of blurring the texture information included in the luminance channel 503. Thus, removing the noise in the luminance channel 503 via the first MRF filter 504 involves a balance between noise removal and texture preservation.

The chrominance channel 508 generally includes significant chrominance noise (i.e., color noise), which includes coarse grain noise of relatively large sizes. Thus, in order to eliminate the coarse grain noise in the chrominance channel 508, a maximum value from $(\sigma_n)_t$ is used in determining the range sigma $\sigma_r$ values for the second MRF filter 510. In an example, the range sigma $\sigma_r$ for processing the chrominance channel 508 in the second MRF filter 510 is determined according to:

$$(\sigma_r)^{UV}_t = m_3 \times \max[(\sigma_n)_{t,ij}], \quad \text{(Eqn. 5)}$$

where $\max[(\sigma_n)_{t,ij}]$ is a maximum value of $(\sigma_n)_{t,ij}$ for the different resolution levels and for all pixels of the YUV image 502, $(\sigma_r)_t^{UV}$ is the range sigma $\sigma_r$ for the MRF filter 510 at the resolution level of t, and $m_3$ is a third scaling factor that is an integer number.

For the wavelet threshold filtering employed in the first and second MRF filters 504, 510, threshold values for the HL, LH, and HH frequency sub-bands are derived from $(\sigma_n)_t$ at each of the different resolution levels t. Because the HL, LH, and HH frequency sub-bands generally include detail information including edge and texture information, threshold values for the luminance and chrominance channels 503, 508 are determined on a pixel-by-pixel basis, such that each pixel has its own threshold value. In an example, the threshold values are determined according to:

$$th_t = \frac{(\sigma_n)_t^2}{(\sigma_X)_{t,ij}}, \quad \text{(Eqn. 6)}$$

where $(\sigma_X)_{t,ij} = \sqrt{\max((\sigma_Y)_{t,ij}^2 - (\sigma_n)_{t,ij}^2, 0)}$ ;

$$(\sigma_Y)_{t,ij}^2 = \text{mean}(Y_{t,ij}^2).$$

Figure 6:
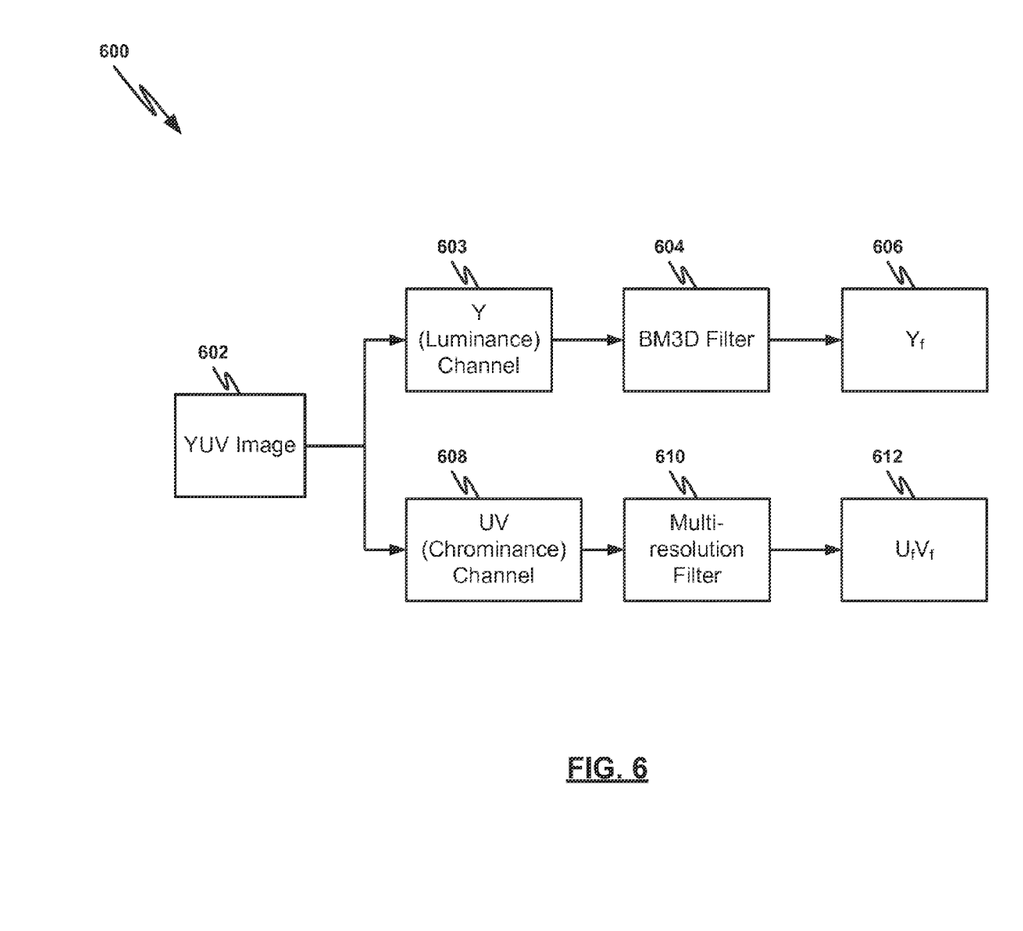
FIG. 6 is a block diagram for processing a YUV image including a block-matching three-dimensional filter and a multi-resolution filter.

FIG. 6 is a block diagram 600 for processing a YUV image 602 including a block-matching three-dimensional (BM3D) filter 604 and a multi-resolution (MRF) filter 610. The MRF filter 610 performs decomposition and noise filtering on a chrominance channel 608 of the YUV image 602. By contrast the BM3D filter 604 performs noise filtering on a luminance channel 603 of the YUV image 602 without performing decomposition on the luminance channel 603. As illustrated in FIG. 6, the YUV image 602 includes the luminance channel 603 and the chrominance channel 608 that are processed independently at the separate filters 604, 610. In an example, the BM3D filter 604 groups matching 2D blocks of the luminance channel 603 to form 3D arrays and then applies collaborative filtering to the 3D arrays. This method is configured to remove fine grain noise and enhance texture details of the luminance channel 603. Based on the independent processing of the luminance and chrominance channels 603, 608, the BM3D filter 604 and the MRF filter 610 output a filtered $Y_f$-component 606 and a filtered $U_f V_f$-component 612, respectively.

The BM3D filter 604 and the MRF filter 610 utilize filter parameters that are based on noise characteristics of the YUV image 602, including standard deviation of noise values for the YUV image 602. In an example, the standard deviation of noise values are determined as described above with reference to FIG. 5. Further, parameter settings for the MRF filter 610 are determined as described above with reference to FIG. 5. To determine parameter settings for the BM3D filter 604, the BM3D filter 604 uses an estimation of the noise standard deviation $\sigma_n$ to process the YUV image 602 without decomposition. Specifically, in determining the noise estimation for the BM3D filter 604, the noise estimation is obtained from $(\sigma_n)_1$ (i.e., $(\sigma_n)_t$ with t=1). The BM3D filter 604 uses the noise estimation from $(\sigma_n)_1$ because the BM3D filter 604 processes the luminance channel 603 at the original resolution level of the luminance channel 603 without decomposition. In an example, a scaled version of a median value from $(\sigma_n)_1$ is used to determine the noise standard deviation $\sigma_n$ for the BM3D filter 604. In the example, the noise standard deviation $\sigma_n$ for the BM3D filter 604 is calculated according to:

$$(\sigma_n)^{BM3D} = m_1 \times \text{Median}[(\sigma_n)_{1,ij}], \quad \text{(Eqn. 7)}$$

where $(\sigma_n)^{BM3D}$ is the noise standard deviation $\sigma_n$ for the BM3D filter 604, $m_1$ is a scaling factor that is an integer, and Median$[(\sigma_n)_{1,ij}]$ is a median value of $(\sigma_n)_{t,ij}$ for all pixels of the image at the resolution level of t=1. The t=1 resolution level represents the resolution level of the image 602 without any decomposition.

The examples of FIGS. 5 and 6 utilize a pixel-based calculation of $\sigma_n$, such that the noise standard deviation $\sigma_n$ is determined for each pixel of the YUV images 502, 602. In contrast to the pixel-based calculations described above, in other examples, a block-based calculation of $\sigma_n$ is performed. In a situation where an image is captured under a high light condition, chrominance noise is less serious as compared to situations where the image is captured under a low light condition. In an example, when the image is captured under the high light condition, the $HH_f$ frequency sub-band is divided into N×N blocks, where N represents a number of pixels. The calculation procedures for determining $(\sigma_n)_{t,ij}$, $(\sigma_r)_{t,ij}^Y$, $(\sigma_r)_t^{UV}$, $th_t$, $(\sigma_n)^{BM3D}$ according to Equations 3-7 are similar to those described above, except that individual pixels are not considered, and instead, values are calculated for each of the N×N blocks. The use of the block-based calculation of $\sigma_n$ reflects the fact that under the high light condition, the image should have an adequate signal-to-noise ratio at the outset, thus permitting the less computationally intensive block-based calculation. In an example, where MRF filters are used to filter and decompose an input image, each sub-band is divided into N×N blocks for the image, where N=4.

In an example, a determination is made as to whether an input image was acquired under a high light condition or a low light condition. If the image was acquired under a high light condition, standard deviation of noise values are calculated on a block basis using the N×N blocks described above. By contrast, if the image was acquired under a low light condition, the standard deviation of noise values are calculated on a per-pixel basis.

In an example, the determination as to whether the input image was acquired under a high light condition or a low light condition is used in setting parameters of the noise filters. For example, when an MRF filter is used to decompose the input image, if the input image was acquired under a high light condition, the input image may be subject to a smaller number of decompositions as compared to a situation where the input image was acquired under a low light condition. In an example, in filtering the chrominance channel using the MRF filter, two levels of decomposition are used if the image was acquired under the high light condition, and three levels of decomposition are used if the image was acquired under the low light condition. In the example, if the luminance channel is subject to decomposition via an MRF filter, a single level of decomposition may be used in filtering the luminance channel regardless of the light condition. The use of the single level of decomposition for filtering the luminance channel, as compared to the multiple levels of decomposition used for filtering the chrominance channel, reflects the fact that the luminance channel generally includes less color noise than the chrominance channel and thus requires less extensive noise removal.

In another example, if the input image was acquired under a high light condition, lower values for range sigma $(\sigma_r)$ are used in a bilateral filter, as compared to situations where the input image was acquired under a low light condition. As explained above, the range sigma value corresponds, generally, to a strength of the bilateral filter. In the high light condition, a lower strength of the bilateral filter may be sufficient, and the lower strength may avoid issues caused by the use of a higher filter strength (e.g., loss of edge and texture information in the input image). Similarly, if the input image was acquired under a high light condition, lower values for the $m_1$, $m_2$, and $m_3$ scaling factors are used in the BM3D and MRF filters, as compared to situations where the input image was acquired under a low light condition. The use of the lower values for the $m_1$, $m_2$, and $m_3$ scaling factors may decrease the strength of the BM3D and bilateral filters and thus avoid the issues caused by the use of a higher filter strength. In each of the examples described above, light sources are considered in determining parameter settings for the noise reduction filters in order to balance denoising performance and computational efficiency.

Figure 7:
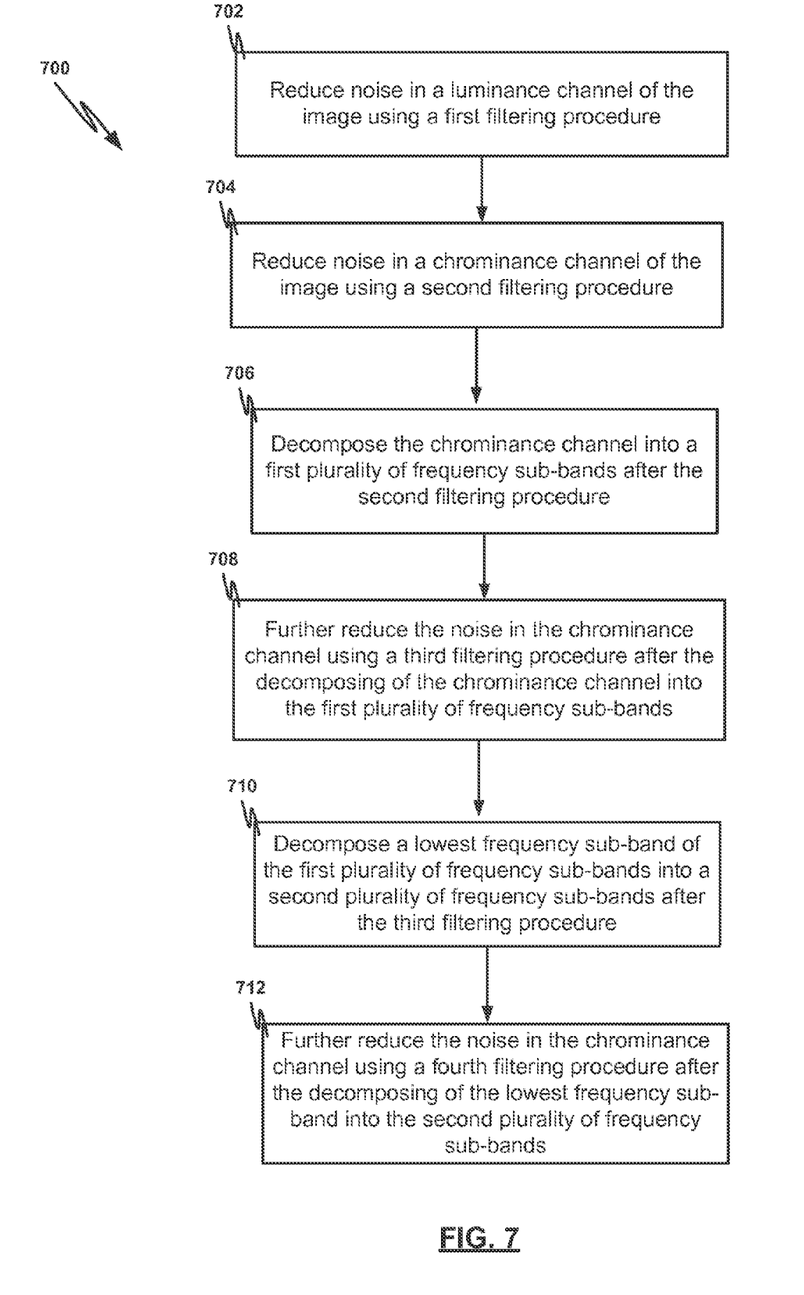
FIG. 7 is a flowchart illustrating an example method for reducing noise in an image.

FIG. 7 is a flowchart 700 illustrating an example method for reducing noise in an image. At 702, noise is reduced in a luminance channel of the image using a first filtering procedure. At 704, noise is reduced in a chrominance channel of the image using a second filtering procedure. At 706, the chrominance channel is decomposed into a first plurality of frequency sub-bands after the second filtering procedure, where each frequency sub-band of the first plurality of frequency sub-bands represents the chrominance channel at a first resolution. At 708, the noise is further reduced in the chrominance channel using a third filtering procedure after the decomposing of the chrominance channel into the first plurality of frequency sub-bands. The third filtering procedure is applied to each frequency sub-band of the first plurality of frequency sub-bands. At 710, a lowest frequency sub-band of the first plurality of frequency sub-bands is decomposed into a second plurality of frequency sub-bands after the third filtering procedure. Each frequency sub-band of the second plurality of frequency sub-bands represents the chrominance channel at a second resolution that is lower than the first resolution. At 712, the noise is further reduced in the chrominance channel using a fourth filtering procedure. The fourth filtering procedure is applied to each frequency sub-band of the second plurality of frequency sub-bands.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method of reducing noise in an image, the method comprising:
reducing noise in a luminance channel of the image using a first filtering procedure;
reducing noise in a chrominance channel of the image using a second filtering procedure;
decomposing the chrominance channel into a first plurality of frequency sub-bands after the second filtering procedure, each frequency sub-band of the first plurality of frequency sub-bands representing the chrominance channel at a first resolution;
further reducing the noise in the chrominance channel using a third filtering procedure after the decomposing of the chrominance channel into the first plurality of frequency sub-bands, the third filtering procedure being applied to each frequency sub-band of the first plurality of frequency sub-bands; and
decomposing a lowest frequency sub-band of the first plurality of frequency sub-bands into a second plurality of frequency sub-bands after the third filtering procedure, each frequency sub-band of the second plurality of frequency sub-bands representing the chrominance channel at a second resolution that is lower than the first resolution.

2. The method of claim 1, wherein the first filtering procedure is configured to preserve edge information or texture information in the luminance channel based on first filter parameters, and wherein the second filtering procedure processes the chrominance channel independently of a processing of the luminance channel in the first filtering procedure, the second filtering procedure utilizing second filter parameters that are different from the first filter parameters.

3. The method of claim 1, wherein the reducing of the noise in the chrominance channel using the second and third filtering procedures includes:
performing, using a bilateral filter, spatial averaging over a window of pixels of the chrominance channel, wherein the bilateral filter is applied to i) the chrominance channel of the image prior to the decomposing of the chrominance channel into the first plurality of frequency sub-bands, and ii) the lowest frequency sub-band of the first plurality of frequency sub-bands.

4. The method of claim 1, further comprising:
decomposing the luminance channel into a third plurality of frequency sub-bands after the first filtering procedure; and
further reducing the noise in the luminance channel using a fourth filtering procedure after the decomposing of the luminance channel into the third plurality of frequency sub-bands, wherein the luminance channel is not further decomposed following the decomposing of the luminance channel into the third plurality of frequency sub-bands.

5. The method of claim 1, further comprising:
determining standard deviation of noise values for the image, wherein the standard deviation of noise values are determined for each unit of the image, a unit comprising a single pixel or a group of pixels of the image; and
determining whether the image was acquired under a high light condition or a low light condition, wherein if the image was acquired under the high light condition, the unit for which the standard deviation of noise values are determined is the group of pixels of the image, and wherein if the image was acquired under the low light condition, the unit for which the standard deviation of noise values are determined is the single pixel of the image.

6. The method of claim 1, further comprising:
determining standard deviation of noise values for the image based on $$(\sigma_n)_{t,ij} = m_1 \times \text{Median}(|Y_{t,ij}|),$$

where $(\sigma_n)_{t,ij}$ is a standard deviation of noise value for the image at a resolution level of t for a pixel of the image having coordinates of (i,j), $m_1$ is a scaling factor, and $Y_{t,ij}$ represents a window of pixels with a center at the coordinates of (i,j) at the resolution level t.

7. The method of claim 1, wherein the first filtering procedure utilizes a block-matching three-dimensional filter, and wherein the utilizing of the block-matching three-dimensional filter in the first filtering procedure reduces the noise in the luminance channel without decomposing the luminance channel.

8. The method of claim 1, further comprising:
determining whether the image was acquired under a high light condition or a low light condition; and
if the image was acquired under the low light condition:
further reducing the noise in the chrominance channel using a fourth filtering procedure after the decomposing of the lowest frequency sub-band of the plurality of sub-bands, the fourth filtering procedure being applied to each frequency sub-band of the second plurality of frequency sub-bands, and
decomposing a lowest frequency sub-band of the second plurality of frequency sub-bands into a third plurality of frequency sub-bands after the fourth filtering procedure, each frequency sub-band of the third plurality of frequency sub-bands representing the chrominance channel at a third resolution that is lower than the second resolution.

9. The method of claim 1, further comprising:
converting the image from an RGB format to a YUV format, the YUV format including the luminance channel and the chrominance channel.

10. The method of claim 1, wherein the decomposing of the chrominance channel into the first plurality of frequency sub-bands is performed via a wavelet transformation to generate the first plurality of frequency sub-bands including an LL sub-band, an LH sub-band, a HL sub-band, and an HH sub-band, the LL sub-band being the lowest frequency sub-band of the first plurality of frequency sub-bands.

11. A system for reducing noise in an image, the system comprising:
a first filter configured to reduce noise in a luminance channel of the image using a first filtering procedure;

a second filter configured to reduce noise in a chrominance channel of the image using a second filtering procedure;

a first transformation unit configured to decompose the chrominance channel into a first plurality of frequency sub-bands after the second filtering procedure, each frequency sub-band of the first plurality of frequency sub-bands representing the chrominance channel at a first resolution;

a third filter configured to further reduce the noise in the chrominance channel using a third filtering procedure after the decomposing of the chrominance channel into the first plurality of frequency sub-bands, the third filtering procedure being applied to each frequency sub-band of the first plurality of frequency sub-bands; and a second transformation unit configured to decompose a lowest frequency sub-band of the first plurality of frequency sub-bands into a second plurality of frequency sub-bands after the third filtering procedure, each frequency sub-band of the second plurality of frequency sub-bands representing the chrominance channel at a second resolution that is lower than the first resolution.

12. The system of claim 11, wherein the first filtering procedure is configured to preserve edge information or texture information in the luminance channel based on first filter parameters, and wherein the second filtering procedure processes the chrominance channel independently of a processing of the luminance channel in the first filtering procedure, the second filtering procedure utilizing second filter parameters that are different from the first filter parameters.

13. The system of claim 11, wherein the second filter and the third filter each include a bilateral filter, the bilateral filter being configured to perform spatial averaging over a window of pixels of the chrominance channel, and wherein the bilateral filter is applied to i) the chrominance channel of the image prior to the decomposing of the chrominance channel into the first plurality of frequency sub-bands, and ii) the lowest frequency sub-band of the first plurality of frequency sub-bands.

14. The system of claim 11, further comprising:
a third transformation unit configured to decompose the luminance channel into a third plurality of frequency sub-bands after the first filtering procedure; and
a fourth filter configured to further reduce the noise in the luminance channel using a fourth filtering procedure after the decomposing of the luminance channel into the third plurality of frequency sub-bands, wherein the luminance channel is not further decomposed following the decomposing of the luminance channel into the third plurality of frequency sub-bands.

15. The system of claim 11, further comprising:
a noise analyzer configured to determine standard deviation of noise values for the image, wherein the standard deviation of noise values are determined for each unit of the image, a unit comprising a single pixel or a group of pixels of the image, wherein it is determined whether the image was acquired under a high light condition or a low light condition, wherein if the image was acquired under the high light condition, the unit for which the standard deviation of noise values are determined is the group of pixels, and wherein if the image was acquired under the low light condition, the unit for which the standard deviation of noise values are determined is the single pixel of the image.

16. The system of claim 11, further comprising:
a noise analyzer configured to determine standard deviation of noise values for the image based on $$(\sigma_n)_{t,ij} = m_1 \times \text{Median}(|Y_{t,ij}|),$$

where $(\sigma_n)_{t,ij}$ is a standard deviation of noise value for the image at a resolution level of t for a pixel of the image having coordinates of (i,j), $m_1$ is a scaling factor, and $Y_{t,ij}$ represents a window of pixels with a center at the coordinates of (i,j) at the resolution level t.

17. The system of claim 11, wherein the first filter is a block-matching three-dimensional filter configured to reduce the noise in the luminance channel without decomposing the luminance channel.

18. The system of claim 11, further comprising:
a noise analyzer configured to determine whether the image was acquired under a high light condition or a low light condition,
wherein if the image was acquired under the low light condition:
a fourth filter reduces the noise in the chrominance channel using a fourth filtering procedure after the decomposing of the lowest frequency sub-band of the plurality of sub-bands, the fourth filtering procedure being applied to each frequency sub-band of the second plurality of frequency sub-bands, and
a third transformation unit decomposes a lowest frequency sub-band of the second plurality of frequency sub-bands into a third plurality of frequency sub-bands after the fourth filtering procedure, each frequency sub-band of the third plurality of frequency sub-bands representing the chrominance channel at a third resolution that is lower than the second resolution.

19. The system of claim 11, further comprising:
an image conversion unit configured to convert the image from an RGB format to a YUV format, the YUV format including the luminance channel and the chrominance channel.

20. The system of claim 11, wherein the decomposing of the chrominance channel into the first plurality of frequency sub-bands is performed via a wavelet transformation to generate the first plurality of frequency sub-bands including an LL sub-band, an LH sub-band, a HL sub-band, and an HH sub-band, the LL sub-band being the lowest frequency sub-band of the first plurality of frequency sub-bands.

* * * * *